United States Patent

[11] 3,609,094

| | | |
|---|---|---|
| [72] | Inventor | Francis N. Shaffer<br>Towanda, Pa. |
| [21] | Appl. No. | 767,728 |
| [22] | Filed | Oct. 15, 1968 |
| [45] | Patented | Sept. 28, 1971 |
| [73] | Assignee | Sylvania Electric Products Inc. |

[54] YTTERBIUM-ACTIVATED STRONTIUM PHOSPHATE PHOSPHORS
1 Claim, 5 Drawing Figs.

[52] U.S. Cl. .................................................. 252/301.4 P
[51] Int. Cl. ........................................................ C09k 1/36
[50] Field of Search ........................................ 252/301.4 P

[56] References Cited
UNITED STATES PATENTS 3,025,423  3/1962  Rimbach .................. 252/301.4

*Primary Examiner*—Robert D. Edmonds
*Attorneys*—Norman J. O'Malley and Owen J. Meegan ABSTRACT: Compounds of the ytterbium-activated strontium phosphate are novel and useful blue-emitting phosphors under cathode-ray and X-ray excitation.

FRANCIS N. SHAFFER
INVENTOR

FRANCIS N. SHAFFER
INVENTOR

BY
ATTORNEY

YTTERBIUM-ACTIVATED STRONTIUM PHOSPHATE PHOSPHORS

BACKGROUND OF THE INVENTION

1. Field of the Invention

This invention relates to synthetic inorganic phosphors. More precisely, the invention disclosed herein relates to compounds of ytterbium-activated strontium phosphate which function as phosphors when exposed to a source of activating radiation.

2. Description of the Prior Art

Phosphors are known products of commerce. Generally the term is employed in the art to describe luminescent of fluorescent solids which comprise two essential ingredients; a "host matrix" and an activator. Better known host materials include silicates, phosphates, sulfides, selenides, the alkali halides and oxides of calcium, magnesium, barium, and zinc, as well as other materials which could be mentioned. Activators most frequently employed include amount other, copper, silver, thallium, lead, cerium, chromium, titanium and tin. Oftentimes, amounts of activator ranging from only a few parts per million to several percent can confer fluorescent properties on the host compound. Generally, synthetic phosphors are readily prepared by reacting well-mixed, finely divided powders of the host and activator at high temperatures.

SUMMARY OF THE INVENTION

In accordance with the practice of the present invention, compounds of ytterbium-activated strontium phosphate are presented as novel and useful phosphors. Phosphors of the present invention can be readily prepared by the high-temperature reaction of well-mixed mixtures of decomposable compounds containing the ingredients desired in the final phosphor. Such compounds include among others, the inorganic and organic salts and oxides containing the cations or anions involved. Preferably the respective concentrations of compounds containing the cations and anions are adjusted so that the ratio of cations to anions in the final phosphor is substantially stoichiometric, e.g., about 3:2.

DESCRIPTION OF THE PREFERRED EMBODIMENTS

The phosphors of the present invention are usually prepared by firing the mixtures in two steps. For example, phosphors of the present invention can be suitably prepared by employing a firing procedure wherein the mixture is fired at about 1,150° C. for about 1 hour in each step. A common level of cathodoluminescence and roentgenoluminescence can be obtained in the phosphors of the present invention by firing one or more steps over a broad range of firing temperature and atmosphere conditions including oxidizing air, neutral-nitrogen or reducing-nitrogen-hydrogen mixtures. Visible photoluminescence can also be obtained by firing and cooling phosphors, wherein the ratio of cations to anions is substantially stoichiometric, in a strong reducing atmosphere such as a nitrogen-hydrogen mixture wherein the concentration of hydrogen is between about 15 to about 50 percent by volume.

The present invention and manners of practicing same will be better understood by reference to the following illustrative example.

EXAMPLE I

This example describes a method for preparing a phosphor of the present invention having the following composition:

| | |
|---|---|
| Strontium | 2.99 g. atom |
| Ytterbium | 0.025 g. atom |
| Phosphate (PO$_4$ | 2.00 g. mol |

Mortar together 14.8 grams strontium di-orthophosphate (98.56% SrHPO$_4$), 5.85 g. strontium carbonate, and 0.2 g. ytterbium oxide and fire the mixture in a covered 30 ml. silica crucible for 1 hour at 1,150° C. in a nitrogen atmosphere. After cooling, grind the phosphor and refire as above for 1 hour at 1,150° C. Cool and grind the final phosphor.

Figure 1:
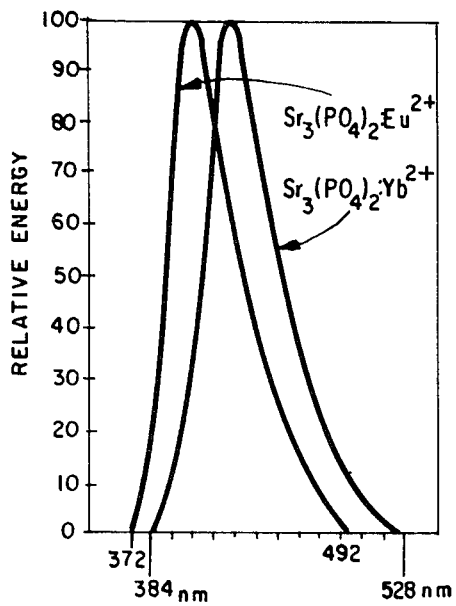
FIGS. 1-3 of the drawing illustrates the spectral energy curve of the prepared phosphors and FIGS. 4 and 5 illustrate cathode-ray tube structures in which the phosphors are disposed.

FIG. 1 illustrates the spectral energy curve of the above prepared phosphor under cathode-ray excitation as compared to the curve of a europium-activated strontium phosphate phosphor containing 0.02 g. atoms europium per gram mole of phosphor.

By essentially following the above procedure, various phosphors of the present invention can be prepared having different concentrations of strontium and ytterbium. Table I below summarizes the effect on cathode-ray excited relative brightness of varying ratios of Sr to PO$_4$ at two different Yb levels compared with a Sr$_3$(PO$_4$)$_2$:Eu$^{2+}$ phosphor. The data show that when the ratio of total strontium plus ytterbium cation to phosphate anion as expressed by the formula (Sr$_{3-x}$Yb$_x$)(PO$_4$)$_2$ is not close to stoichiometric orthophosphate, the brightness of the phosphor is reduced. Reasonable brightness is obtained over the range 2.30 to 3.15 total cation to 2.00 phosphate anion.

TABLE I

| Sample | Sr g. atom | PO$_4$ g. mol | Yb g. atom | Relative Brightness |
|---|---|---|---|---|
| A | 2.05 | 2.00 | 0.02 | 22 |
| B | 2.10 | 2.00 | 0.02 | 33 |
| C | 2.15 | 2.00 | 0.02 | 45 |
| D | 2.25 | 2.00 | 0.02 | 67 |
| E | 2.50 | 2.00 | 0.02 | 90 |
| F | 3.00 | 2.00 | 0.02 | 90 |
| F | 3.00 | 2.00 | 0.02 | 90 |
| H | 3.03 | 2.00 | 0.02 | 90 |
| I | 3.05 | 2.00 | 0.02 | 78 |
| J | 3.10 | 2.00 | 0.02 | 67 |
| K | 2.80 | 2.00 | 0.05 | 90 |
| L | 2.95 | 2.00 | 0.05 | 100 |
| M | 2.95 | 2.00 | 0.05 | 100 |
| N | 3.00 | 2.00 | 0.05 | 90 |
| O | 3.10 | 2.00 | 0.05 | 45 |
| Standard Sr$_3$(PO$_4$)$_2$:Eu$^{2+}$ | | | | 40 |

Table II below summarizes data showing the effect of cathode-ray excited brightness of varying formulated Yb at a constant ratio of cations to anions of about 3:2.

TABLE II

| Sample | Sr. g. atom | PO$_4$ g. mol | Yb g. atom | Relative Brightness |
|---|---|---|---|---|
| A | 3.00 | 2.00 | 0.006 | 67 |
| B | 3.00 | 2.00 | 0.013 | 90 |
| C | 2.99 | 2.00 | 0.025 | 90 |
| D | 2.95 | 2.00 | 0.05 | 100 |
| E | 2.95 | 2.00 | 0.05 | 100 |
| F | 2.90 | 2.00 | 0.10 | 78 |
| G | 2.85 | 2.00 | 0.15 | 55 |
| H | 2.80 | 2.00 | 0.20 | 55 |
| I | 2.75 | 2.00 | 0.25 | 55 |

EXAMPLE II

This example describes a method for preparing a phosphor of the present invention having the following composition:

| | |
|---|---|
| Strontium | 2.95 g. atom |
| Ytterbium | 0.05 g. atom |
| Phosphate (PO$_4$) | 2.00 g. mol |

Mortar together 29.6 grams of strontium di-orthophosphate (98.56% SrHOP$_4$), 11.2 grams of strontium carbonate, and 0.8 gram of ytterbium oxide and then one-step fire the mixture in a silica boat for 1 hour at 1,150° C. in a nitrogen atmosphere. Cool and then mortar the final phosphor.

Under cathode-ray excitation a material prepared following the method of this example exhibited color and intensity comparable to samples L and M of Table I and its decay time to 10 percent of its initial brightness of 90 microseconds.

Figure 2:
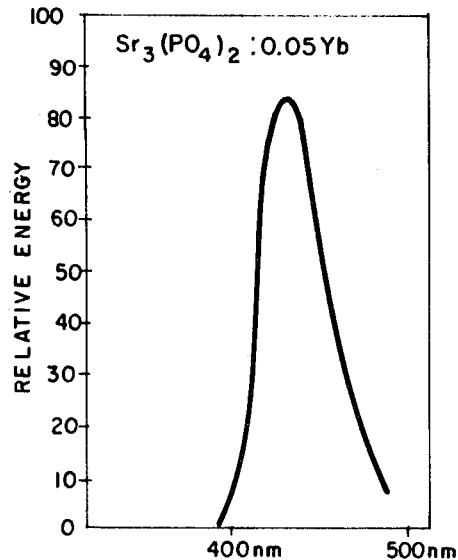
Figure 3:
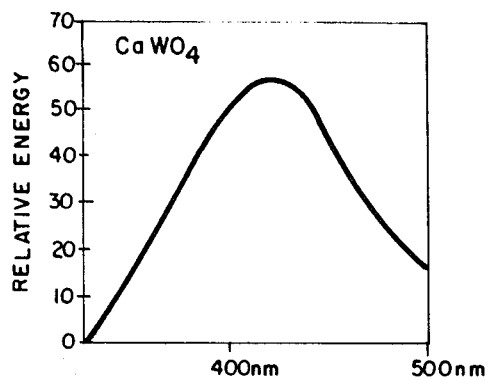

It was compared with a sample of X-ray grade calcium tungstate phosphor under 120 kv. X-ray excitation by the following procedure: A 5-gram sample was pressed level in a brass sample holder that was 1.5 inches in diameter with a quartz window. While being excited the relative response using a Weston photocell (without any filters) was 80 compared with 100 for the calcium tungstate standard. FIGS. 2 and 3 illustrate the spectral energy curves of the two materials under 50 kv. X-ray excitation. The data are summarized in Table III.

TABLE III

| Sample | Photometer brightness, 120 kv. excited | Emission band, 50 kv. excited | | | | Relative efficiency |
|---|---|---|---|---|---|---|
| | | Peak, nm. | Width nm. | Relative band height | Relative band area | |
| $CaWO_4$(X-ray grade) | 100. | 435 | 115 | 52 | 5,980 | 100 |
| $Sr_3(PO_4)_2$: 0.05Yb | 80. | 440 | 40 | 86 | 3,440 | 58 |

These qualitative evaluations indicate $Sr_3(PO_4)_2$:$b$ to have potential as a phosphor or for X-ray intensifying screens where a band emission of about 40 nm. bandwidth peaking at about 440 nm. is desirable.

Figure 4:
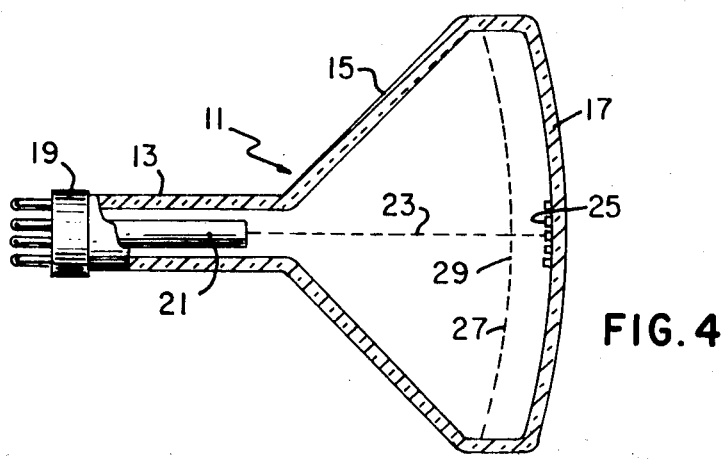

The blue-emitting phosphors of the present invention can be disposed upon the screen of a cathode-ray tube such as shown in FIG. 4 and commonly in use in television-receiving apparatus.

The tube comprises an envelope 11 having a neck portion 13, a funnel portion 15, and a face panel 17. A tube base 19 is attached to the neck portion 13 to provide means for connecting the tube electrodes with their associated receiver circuitry. Within the neck 13 there is mounted an electron gun or guns 21 which provide the electron beam or beams 23 utilized in the operation of the tube. A color screen 25 having the usual configurations of color-emitting phosphors is formed on the internal surface of face panel 17. Positioned adjacent to screen 25, but substantially spaced therefrom, is a mask or grid 27 having therein a plurality of apertures 29. The type of tube illustrated in FIG. 4 may use grid 27 primarily to either focus or deflect beam 23, or to mask and focus the electron beam to attain proper electron impingement upon the color screen 25. The specific grid and screen structures and the potentials on the grid and screen will determine the type of operation in a manner well understood in the art.

Figure 5:
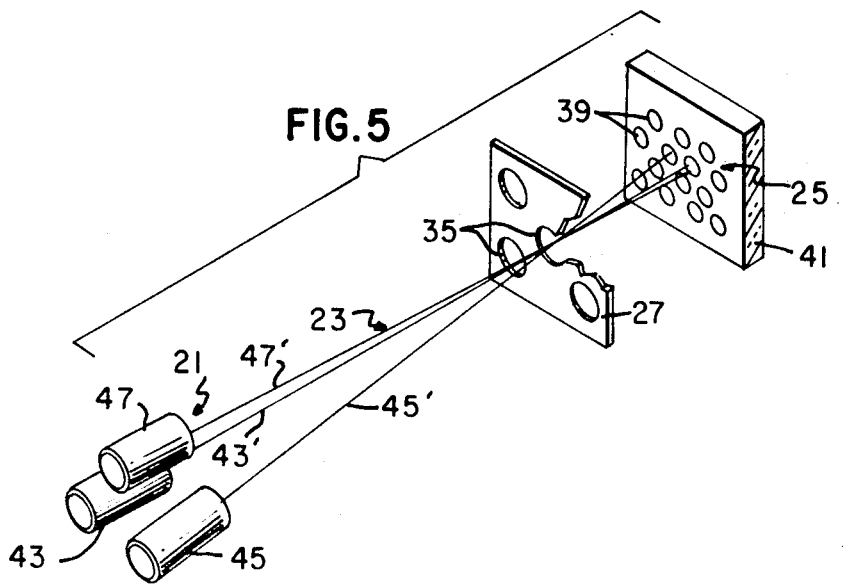

In greater detail, there is shown in FIG. 5 one specific form of a screen and grid structure having internal portions of a trigun shadow mask tube employing a pattern of tricolor phosphor dots discretely arranged on the screen 25. The electron guns or electron-beam emitters 21 are spaced equidistantly from one another and are usually triadmounted to provide static convergence of the respective electron beams at the central mask or grid opening. As a specific example, these electron guns 21 individually emit a beam of electrons 23, all of which converge at an aperture 35 in masks 27, and cross one another to impinge upon the associated color-emitting phosphor dots 39 formed on viewing panel 41. The three electron guns 43, 45 and 47 are oriented to provide electron beams 43', 45' and 47' to the red, green and blue color-emitting phosphor dots respectively.

Many modifications of incidental details offered above for the purpose of illustrating the invention can be employed without departing from the spirit and scope of the invention as defined in the appended claims.

Having described the invention together with preferred embodiments thereof as well as manners of practicing same, what is declared as new and desired to be secured by U.S. Patents is as follows:

As my invention, I claim:
1. A phosphor consisting of a host matrix of strontium phosphate activated by ytterbium.